United States Patent
Frinken et al.

(10) Patent No.: US 11,030,530 B2
(45) Date of Patent: Jun. 8, 2021

(54) METHOD FOR UNSUPERVISED SEQUENCE LEARNING USING REINFORCEMENT LEARNING AND NEURAL NETWORKS

(71) Applicant: Onu Technology Inc., San Jose, CA (US)

(72) Inventors: Volkmar Frinken, Santa Clara, CA (US); Guha Jayachandran, Cupertino, CA (US); Shriphani Palakodety, Palo Alto, CA (US); Veni Singh, San Mateo, CA (US)

(73) Assignee: Onu Technology Inc., San Jose, CA (US)

( * ) Notice: Subject to any disclaimer, the term of this patent is extended or adjusted under 35 U.S.C. 154(b) by 831 days.

(21) Appl. No.: 15/852,512

(22) Filed: Dec. 22, 2017

(65) Prior Publication Data

US 2019/0197409 A1 Jun. 27, 2019

Related U.S. Application Data

(60) Provisional application No. 62/444,094, filed on Jan. 9, 2017.

(51) Int. Cl.
*G06N 3/08* (2006.01)

(52) U.S. Cl.
CPC .............. *G06N 3/088* (2013.01); *G06N 3/08* (2013.01); *G06N 3/084* (2013.01)

(58) Field of Classification Search
CPC ........... G06N 3/088; G06N 3/08; G06N 3/084
See application file for complete search history.

(56) References Cited

U.S. PATENT DOCUMENTS

| 2012/0202538 | A1* | 8/2012 | Uusitalo | ............ H04B 17/3912 455/500 |
| 2014/0156577 | A1* | 6/2014 | Eliasmith | ................ G06N 3/10 706/25 |

(Continued)

OTHER PUBLICATIONS

Forcada et al. "Recursive hetero-associative memories for translation", 1997, Biological and Artificial Computation: From Neuroscience to Technology. IWANN 1997. Lecture Notes in Computer Science, vol. 1240. Springer, Berlin, Heidelberg. pp. 453-462. (Year: 1997).*

(Continued)

*Primary Examiner* — Kakali Chaki
*Assistant Examiner* — Asher Jablon
(74) *Attorney, Agent, or Firm* — Caldwell Intellectual Property Law, LLC (57) ABSTRACT

A system and method provide a sequence learning model. The method for training the sequence learning model comprises retrieving input sequence data. The input sequence data includes one or more input time sequences. The method also encodes the input sequence data into output symbol data using a sequence learning model. The output symbol data includes one or more symbolic representations. The method decodes, based on a neural network, the output symbol data to decoded sequence data, where the decoded sequence data includes one or more decoded time sequences that are to match the one or more input time sequences in the input sequence data. The method further compares the decoded sequence data with the input sequence data and updates the sequence learning model based on the comparison.

14 Claims, 8 Drawing Sheets

(56) References Cited

U.S. PATENT DOCUMENTS

| | | | | |
|---|---|---|---|---|
| 2015/0066821 A1* | 3/2015 | Nakamura | ............. | G06N 7/005 |
| | | | | 706/12 |
| 2019/0117087 A1* | 4/2019 | Yasunaga | ............. | A61B 8/5261 |

OTHER PUBLICATIONS

Zeiler, Matthew D. "Adadelta: an adaptive learning rate method." arXiv preprint arXiv:1212.5701 (2012). (Year: 2012).*

Cho, Kyunghyun, et al. "Learning phrase representations using RNN encoder-decoder for statistical machine translation." arXiv preprint arXiv:1406.1078 (2014). (Year: 2014).*

H. van Hoof, N. Chen, M. Karl, P. van der Smagt and J. Peters, "Stable reinforcement learning with autoencoders for tactile and visual data," 2016 IEEE/RSJ International Conference on Intelligent Robots and Systems (IROS), Daejeon, 2016, pp. 3928-3934 (Year: 2016).*

* cited by examiner

METHOD FOR UNSUPERVISED SEQUENCE LEARNING USING REINFORCEMENT LEARNING AND NEURAL NETWORKS

CROSS-REFERENCE TO RELATED APPLICATIONS

This application claims priority under 35 U.S.C. § 119(e) to U.S. Provisional Patent Application Ser. No. 62/444,094, titled "A Method for Unsupervised Sequence Learning Using Reinforcement Learning and Neural Networks," filed Jan. 9, 2017, the disclosure of which is hereby incorporated by reference herein in its entirety.

TECHNICAL FIELD

Described embodiments relate generally to unsupervised sequence learning, and more particularly to using reinforcement learning to auto-encode sequences to transform a set of long input sequences of real-valued vector into shorter sequences consisting of distinct symbols and then using a recurrent neural network for decoding.

BACKGROUND

Sequences are widely used and important data representation. They capture ordered information. For example, in a time-series, such as financial data, temperature recordings, sound waves, pen trajectories in handwritten notes, or videos of human actions, the position of a datum is dependent on its context. Often, the observed data points are generated by a latent process that changes more slowly than the sampling rate of data point collection. For example, in human speech, phonemes have a frequency of around 10 Hz, whereas sound is usually sampled with a frequency of 22100 Hz or 44200 Hz. As a result, for automatic speech recognition, methods are needed to perform sequence-to-sequence mapping, where a large and unknown number of elements of an input sequence is mapped onto each element of an output sequence.

In supervised sequence recognition, sequence-to-sequence mappings are estimated using a large set of so-called training sequences, e.g., pairs of input and output sequences. It is possible to build a stochastic, generative model, e.g., with hidden Markov models, and to estimate state transition probabilities and output probabilities of each state from a set of annotated sequences. Similarly, discriminative models exist in the form of neural networks that can be trained to map input sequences to output sequences.

However, creating training pairs of input and output sequences is usually done manually and constitutes a time-consuming, expensive and sometimes impossible task, e.g., when sound or video recordings are to be transcribed. In contrast, unlabeled input sequence data can be gathered often in little or no time. One way of decreasing the human cost involved in creating systems for automatic sequence processing is to mix labeled and unlabeled data in semi-supervised learning. In these approaches, however, knowledge about the latent processes is still implicitly provided through the supervised data.

It is favorable to model sequences for prediction in an unsupervised manner, i.e., without labeled training data. Without training output data, one can still gain information by analyzing the prior probability distribution. Approaches such as clustering or auto-encoders are typical examples of unsupervised learning methods. The goal is to simplify the data representation while maintaining the important information of the data.

Unsupervised learning for sequences is less straightforward as individual elements of a sequence are not independent of each other. Meaningful parts of a sequence, such as phonemes in a sound recording or an action in a video, do not have a fixed length or clearly marked beginnings or endings. Hence, an unsupervised sequence learning, to transform a long input sequence of a n-dimensional real-valued vectors into a short, symbolic sequence, must solve concurrently the tasks of (1) identifying the subsequence to be mapped to one output element and (2) identifying the symbol to which an input sequence belongs, which may or may not depend on previous or succeeding sequence elements.

SUMMARY OF THE DISCLOSURE

A method, system and computer-readable storage medium provides for training a sequence learning model based on reinforcement learning and neural network.

In one embodiment, the sequence learning system comprises an encoder and a decoder. The encoder retrieves input sequence data, where the input sequence data includes one or more input time sequences. The encoder encodes the input sequence data into output symbol data using a sequence learning model, where the output symbol data includes one or more symbolic representations. The decoder decodes, based on a neural network, the output symbol data to decoded sequence data, where the decoded sequence data includes one or more decoded time sequences that are to match the one or more input time sequences in the input sequence data. The decoder compares the decoded sequence data with the input sequence data. The encoder updates the sequence learning model based on the comparison.

Another embodiment includes a computer method for training a sequence learning model based on reinforcement learning and neural network. The method comprises retrieving input sequence data. The input sequence data includes one or more input time sequences. The method encodes the input sequence data into output symbol data using a sequence learning model. The output symbol data includes one or more symbolic representations. The method decodes, based on a neural network, the output symbol data to decoded sequence data, where the decoded sequence data includes one or more decoded time sequences that are to match the one or more input time sequences in the input sequence data. The method further compares the decoded sequence data with the input sequence data and updates the sequence learning model based on the comparison.

A further embodiment includes a non-transitory computer-readable storage medium that stores executable computer program instructions for training a sequence learning model based on reinforcement learning and neural network in the manner described above. The computer program instructions comprise retrieving input sequence data. The input sequence data includes one or more input time sequences. The computer program instructions also comprise encoding the input sequence data into output symbol data using a sequence learning model. The output symbol data includes one or more symbolic representations. The computer program instructions comprise decoding, based on a neural network, the output symbol data to decoded sequence data. The decoded sequence data includes one or more decoded time sequences that are to match the one or more input time sequences in the input sequence data. The computer program instructions also comprise comparing the decoded sequence data with the input sequence data. The computer program instructions comprise updating the sequence learning model based on the comparison.

The features and advantages described in the specification are not all inclusive and, in particular, many additional features and advantages will be apparent to one of ordinary skilled in the art in view of the drawings, specification, and claims. Moreover, it should be noted that the language used in the specification has been principally selected for readability and instructional purposes, and may not have been selected to delineate or circumscribe the disclosed subject matter.

While embodiments are described with respect to sequence learning, those skilled in the art would come to realize that the embodiments described herein may be used to process other types of data.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

System Overview

Figure 1:
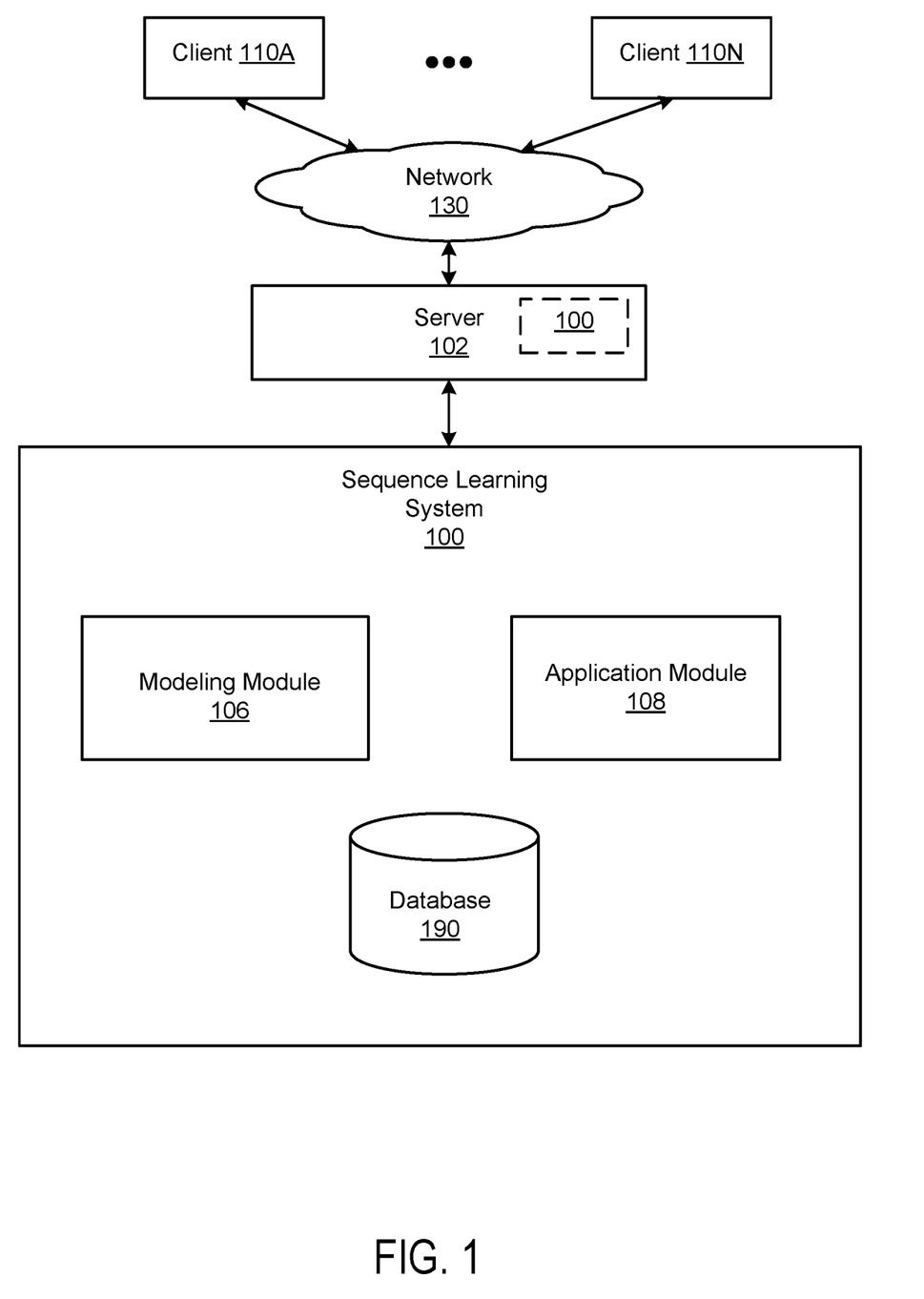
FIG. 1 is a high-level block diagram illustrating a sequence learning system.

FIG. 1 is a block diagram illustrating a sequence learning system 100. Multiple users/viewers may use one or more clients 110A-N (also collectively and individually referred to as "clients 110" hereinafter) to send requests for processing of financial data, temperature recordings, sound waves, pen trajectories in handwritten notes, videos of human actions, or other types of data to a server 102, and may receive recognized information of the data from the server 102. The server 102 communicates with the one or more clients 110 via a network 130. The server 102 sends data to be learned to the sequence learning system 100. In one embodiment, the sequence learning system 100 receives the data from the clients 110, trains a sequence learning model, or recognizes information from the data using the sequence learning model. The sequence learning system 100 returns the recognized information to the clients 110 or to other services processing units. In one embodiment, the sequence learning system 100 can be a part of a cloud computing system.

Turning to the individual entities illustrated on FIG. 1, each client 110 is configured for use by a user to record media content or other types of data and send to the server 102. The client 110 can be any type of computer device, such as a personal computer (e.g., desktop, notebook, laptop) computer, as well as devices such as a mobile telephone, personal digital assistant, IP enabled video player. The client 110 typically includes a processor, a display device (or output to a display device), a local storage, such as a hard drive or flash memory device, to which the client 110 stores data used by the user in performing tasks, and a network interface for coupling to the system 100 via the network 130.

The network 130 enables communications between the clients 110 and the server 102. In one embodiment, the network 130 is the Internet, and uses standardized internetworking or network communications technologies and protocols, known now or subsequently developed that enable the clients 110 to communicate with the server 102.

The server 102 receives user requests for sequence learning from the clients 110. In one embodiment, the server 102 also receives financial data, temperature recordings, sound waves, pen trajectories in handwritten notes, videos of human actions, or other types of data uploaded from the clients 110 by users. For example, the server 102 may receive sound waves and a request for speech recognition from the client 110. The server 102 may send the received sequence data to the sequence learning module 100 for processing, and return results from the sequence learning module 100 to the client 110. In other examples, the server 102 may receive a large amount of sequence data from the client 110, and send the data to the sequence learning module 100 as training data to train the sequence learning model. In one embodiment, the server 102 functions locally instead of remotely, and includes the sequence learning system 100 within it.

The sequence learning system 100 has a modeling module 106, an application module 108 and a database 190. The database 190 stores user uploaded sequence data and sequence data from other sources. The database 190 also stores sequence data encoded and decoded by the other entities of the sequence learning system 100. The sequence learning system 100 can also function as a standalone system to train the sequence learning model based on sequence data and produce the trained sequence learning model for application by other systems or entities.

The modeling module 106 generates and trains a sequence learning model by utilizing a large amount of sequence data. In one embodiment, the modeling module 106 receives input sequence data and transforms the input sequence data into its symbolic representation based on reinforcement learning. For example, the modeling module 106 reads the input sequence by one input element after another and at each time step the modeling module 106 determines an output symbol using the sequence learning model (such as a neural network). In one embodiment, the modeling module 106 decodes the symbolic representation to decoded sequence data (such as a long sequence of real-valued vectors) based on a recurrent neural network. By comparing the decoded sequence data and the original input sequence data, the modeling module 106 calculates an expected end reward.

The modeling module 106 updates the sequence learning model to maximize the expected end reward.

The application module 108 utilizes the sequence learning model trained by the modeling module 106 to process sequence data input by the clients 110. In one embodiment, the application module 108 recognizes characters from raw handwriting notes by utilizing the sequence learning model. In another embodiment, the application module 108 may use the sequence learning model to recognize human speech from input sound wave sequences. In yet another embodiment, the application module 108 may utilize the sequence learning model to obtain or predict financial information or trend from input time-series of financial data.

Computing System Architecture

Figure 2:
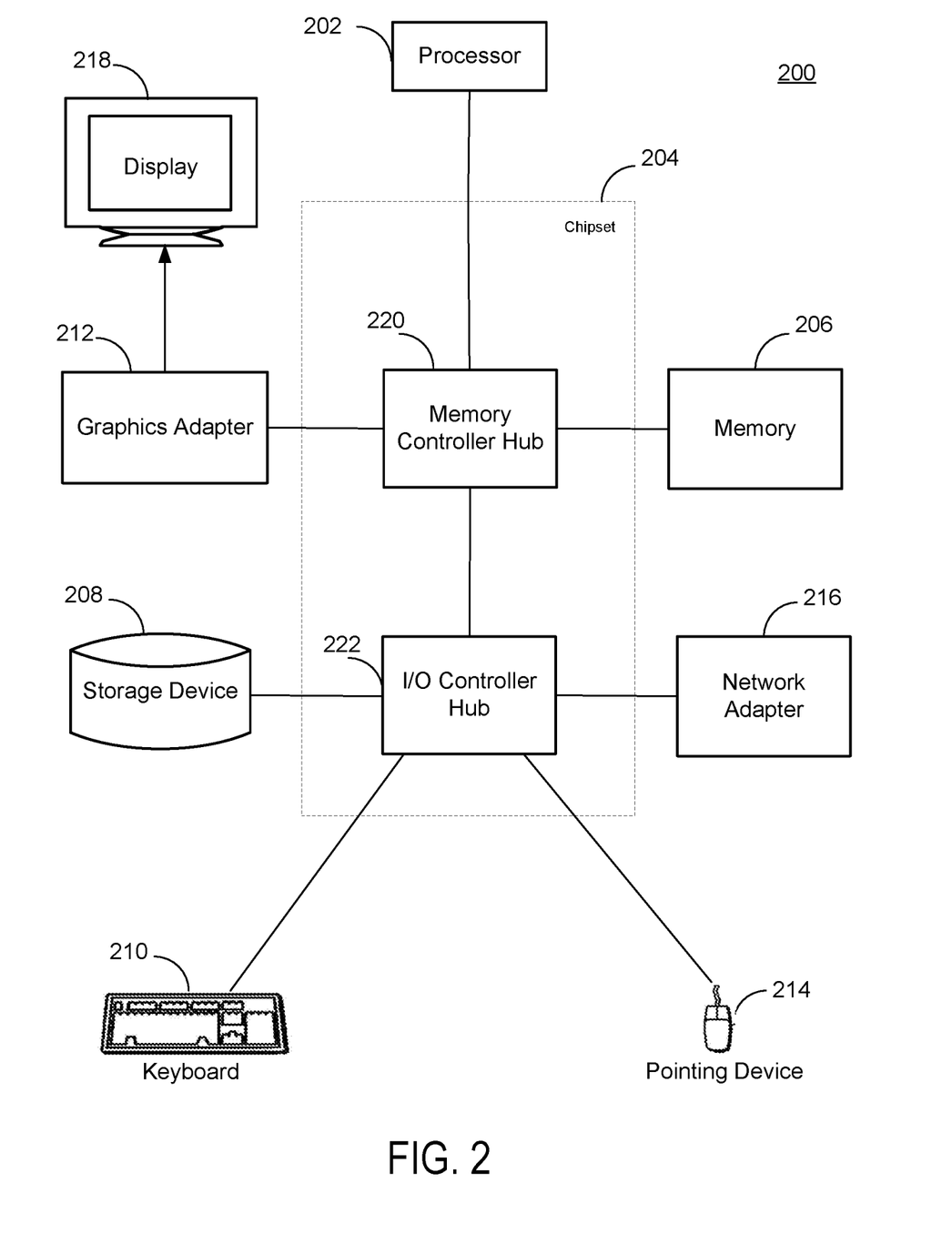
FIG. 2 is a high-level block diagram illustrating an example of a computer for acting as a client device and/or content server in one embodiment.

The entities shown in FIG. 1 are implemented using one or more computers. FIG. 2 is a high-level block diagram of a computer 200 for acting as the server 102, the sequence learning system 100 and/or a client device 170. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 150.

As is known in the art, a computer 200 can have different and/or other components than those shown in FIG. 2. In addition, the computer 200 can lack certain illustrated components. For example, the computers acting as the server 102 can be formed of multiple blade servers linked together into one or more distributed systems and lack components such as keyboards and displays. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Modeling Module

Figure 3:
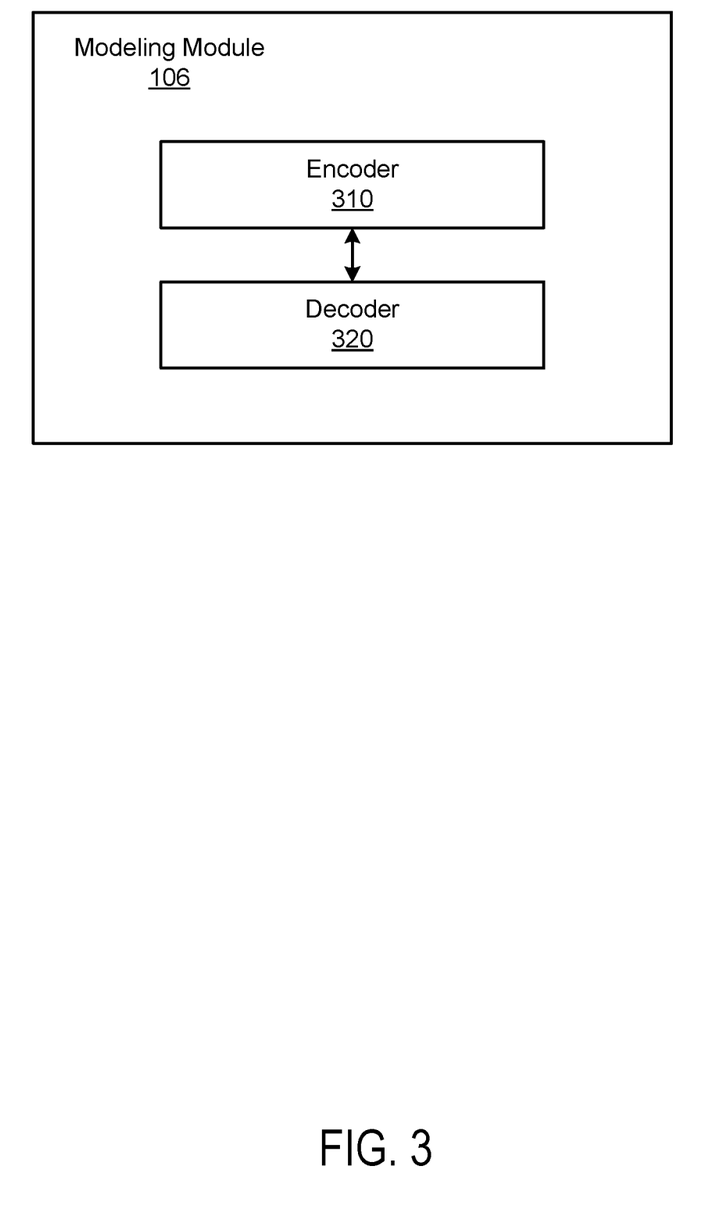
FIG. 3 is a block diagram illustrating a modeling module of the sequence learning system illustrated in FIG. 1.

FIG. 3 is a block diagram illustrating a modeling module 106 of the sequence learning system 100, according to an illustrative embodiment. In the embodiment illustrated in FIG. 3, the modeling module 106 has an encoder 310 and a decoder 320. As described above, the modeling module 106 generates and trains a sequence learning model using reinforcement learning and neural network techniques. Two criteria of the training can be that the intermediate encoded sequence is as short as possible and represented by a fixed set of symbols as well as that the sequences reconstructed in the decoding step resemble the input sequences as closely as possible.

The encoder 310 retrieves input sequence data. For example, the input sequence data can include time sequences of financial data, temperature recordings, sound waves, pen trajectories in handwritten notes, or videos of human actions. In one embodiment, the encoder 310 may determine an output symbolic representation set that has a pre-determined and fixed number of symbolic representation elements. In another embodiment, an administrator of the sequence learning system 100 determines the output symbolic representation set. For example, the output symbolic representation set can be a symbol set having a fixed number of symbols (such as English letters, other characters, or any other types of symbols) as elements. The number of elements of the set can be determined before the training of the sequence learning model.

In one embodiment, the encoder 310 determines whether to emit a non-empty symbol corresponding to an element of the input sequence. If the encoder 310 determines to emit a non-empty symbol, the encoder 310 chooses an output symbol from the pre-determined symbolic representation set based on the sequence learning model. The encoder 310 sends the output symbol data to the decoder 320 to evaluate the output symbol data, and then obtains feedback from the decoder 320 to update the sequence learning model. For example, the encoder 310 can be realized through neural network-based reinforcement learning. Reinforcement learning is a learning strategy to train an agent to interact with an external environment. At each time step t, the encoder 310 executes an action $A_t$, observes the new environment $O_t$ and receives a reward $R_t \in \mathbb{R}$. To determine which action to execute, an agent maintains an internal state $S_t$ and chooses an action according to a policy $\pi(a|s) = P(A_t = a | S_t = s)$. A value function $V_\pi(s)$ is used to predict the estimated future reward of selecting an action according to policy $\pi$ via $$V_\pi(s) = E[G_t | S_t = s]$$

where $G_t$ is the total (discounted) reward, $R_{t+1} + \gamma R_{t+2} + \gamma^2 R_{t+3} + \ldots$, starting from time t. Similarly, an action-value function $q\pi(s, a)$ returns the expected reward when choosing action a in state s and then continue with policy $\pi$. The action-value function is defined as $q_\pi(s, a) = E[G_t | S_t = s, A_t = a]$. Reinforcement learning can be used to process sequences. In particular, the encoder 310 uses reinforcement learning for auto-encoding sequences.

In one embodiment, the encoder 310 is configured as a neural network that reads a sequence and determines at each time step which output symbol to emit. In one embodiment, when training the sequence learning model, no intermediate reward is given. Instead, the sequence learning model can be trained to maximize its expected end reward:

$$E[R_T | s_0] = \Sigma_{y_1 \in Y \cup \{\in\}} H\pi(y_1 | s_0, \pi) \cdot q_{enc}^{dec}(s_0, y_1, \pi), \qquad (1)$$

where $R_T$ is the reward for the encoded sequence, Y is the alphabet of discrete symbols for the encoder 310, $y_1$ is the first symbol of the encoded sequence that is chosen according to $H\pi(y_1 | s_0, \pi)$, and $q_{enc}^{dec}(s_0, y_1, \pi)$ is the action-value function starting from state so, picking element $y_1$ as the first emitted output symbol and continuing with policy $\pi$.

At each time step, the encoder 310 can emit either a symbol from Y or the empty word $\in$. Once a sequence is completed, the encoder 310 sets the emitted output sequence of symbols (including symbols ∈) be $Y=Y_{1:T}$. The value of $q_{enc}^{dec}$ is then set as $$q_{enc}^{dec}(a=Y_t, s=Y_{1:T-1}\pi)=R(Y)=\alpha(-|Y'|)+(1-\alpha)d(X,\text{Dec}(Y')), \quad (2)$$

where Y' indicates the encoded sequence Y without E symbols, |Y'| is the length of Y' and d(X, Dec(Y')) is a distance between input sequence X and the decoded sequence Y'(without E symbols). In this way, a parameter a can be set to provide a tradeoff between aiming on the one hand at creating a shorter and more compact encoded sequence, and on the other hand at a sequence encoding such that the original input sequence can be decoded as accurately as possible.

For uncompleted sequences, the decoder 320 can use a Monte-Carlo sampling to randomly pick elements until the sequence is completed. Given a function $MC(Y, T)=y_1, y_2, \ldots, y_{|Y|}, \hat{y}_{|Y|+1}, \ldots, \hat{y}_T$ that fills an incomplete sequence with randomly chosen elements $\hat{y}$ until the overall length T, the action-value at an intermediate step is the samples average of the action-values of randomly completed sequences, as represented below:

$$q_{enc}^{dec}(a = y_t, s = Y_{1:t-1}\pi) = \frac{1}{M}\sum_{m=1}^{M} R(MC(Y, T)). \quad (3)$$

In one embodiment, the encoder 310 receives the feedback from the decoder 320. For example, the feedback can be the distance between the original input sequence and the decoded sequence. The encoder 310 estimates the expected end reward based on the distance and updates parameters of the model to maximize the expected end reward. The encoder 310 saves the input sequence and output symbolic representation pair, and associated expected end reward. For example, the encoder 310 stores the pair of input sequence and output symbol and the expected end reward in the database 190.

The decoder 320 receives output symbolic representations from the encoder 310. For example, the output symbolic representations can be a sequence of symbols (such as English letters, other language letters, other characters, or any other types of symbols). In one embodiment, as described above, for uncompleted sequence of symbols, the decoder 320 can use a Monte-Carlo sampling to randomly pick elements until the sequence is completed. In one embodiment, the decoder 320 decodes the symbolic representations to decoded sequence data using neural network techniques. For example, the decoded sequence data include time sequences (such as sound waves, video of human actions, handwriting notes, etc.) that are mapped to the symbolic representations. The decoded sequences are to reconstruct, resemble or match the original input sequences as closely as possible. In one embodiment, the decoder 320 computes a distance between the decoded sequence and the input sequence and sends the distance back to the encoder 310. The decoder 320 updates parameters of the neural network accordingly.

In one embodiment, the decoder 320 is configured as a recurrent neural network that reads in the encoded sequence Y' (without E symbols) and generates a sequence Z=Dec(Y) to match the input sequence X as closely as possible. The two sequences, Z and X, may have different lengths $Z=Z_{1:T''}$ and $X=X_{1:T}$, but have elements of the same vector space $z_i$, $x_j \in \mathbb{R}^n$ with $i=1 \ldots T''$ and $j=1 \ldots T$. In one embodiment, the decoder 320 is configured as a LSTM neural network for the sequence-to-sequence mapping. The input symbols, represented as a 1-hot vector, are fed into the decoder 320, e.g., configured as a recurrent LSTM neural network, and are followed by an end-of-transmission (EOT) symbol. Afterwards, zero vectors are fed to the decoder 320, while the output constitutes the decoded sequence Z. An activation of a special EOT node in the output layer indicates that the reconstructed sequence Z is complete. An attention mechanism in the architecture can be used to improve performance for long sequences.

In one embodiment, the decoder 320 can compute the distance function between Z and X via dynamic programming or by padding the shorter sequences with one or more zeros and doing a direct sequence comparison afterwards. The benefit is that each part is differentiable and can be trained with back-propagation. The decoder 320 trains the sequence learning model with regression. For example, the error function is set as the sum of the squared pairwise distances represented as follows:

$$J^{dec}(Z,X)=\Sigma_i(z_i'-x_i')$$

where x' and z' are the vectors $x_i$ and $z_i$ augmented with the EOT node, and $z_i'=z_i^1, z_i^2, \ldots z_i^n$, eot). The EOT node in the target is constantly 0 except for the last entry $z_T'=(x_T^1, x_T^2, \ldots, x_T^n, 1)$. The error gradient is well defined within a recurrent neural network. So via the error gradient, the decoder 320 can train the sequence learning model to recover the sequence X from a symbolic representation Y.

In one embodiment, the decoder 320 cooperates with the encoder 310 to train the sequence learning model. For example, the encoder 310 and the decoder 320 train the sequence learning model by using back-propagation to improve the expected final reward. The encoder 310 or the decoder 320 sets the reward function as $J^{enc}(\theta)=E[R_T|s_o, \theta]$, where $\theta$ are the network parameters to train. According to the way $E[R_T|s_o, \theta]$ is defined, the gradient for $J^{enc}(\theta)$ is given as:

$$\nabla J^{enc}(\theta)=E^{Y-H}[\Sigma_{y_t \in Y \cup \{\in\}} \nabla_\theta H\pi(y_t|Y_{1:t-1},\pi) \cdot q_{enc}^{dec}(Y_{1:t-1},y_t,\pi)].$$

Following standard practice in neural network-based reinforcement learning, the encoder 310 or the decoder 320 approximates the expectation value E [•] by sampling during the training process. In one embodiment, through the back-propagation, the encoder 310 and the decoder 320 are linked closely to train both parts of the sequence learning model simultaneously. A few back-propagation steps of the encoder 310 are followed by a few training steps of the decoder 320, as detailed in Algorithm 1.

Exemplary Methods

Figure 4:
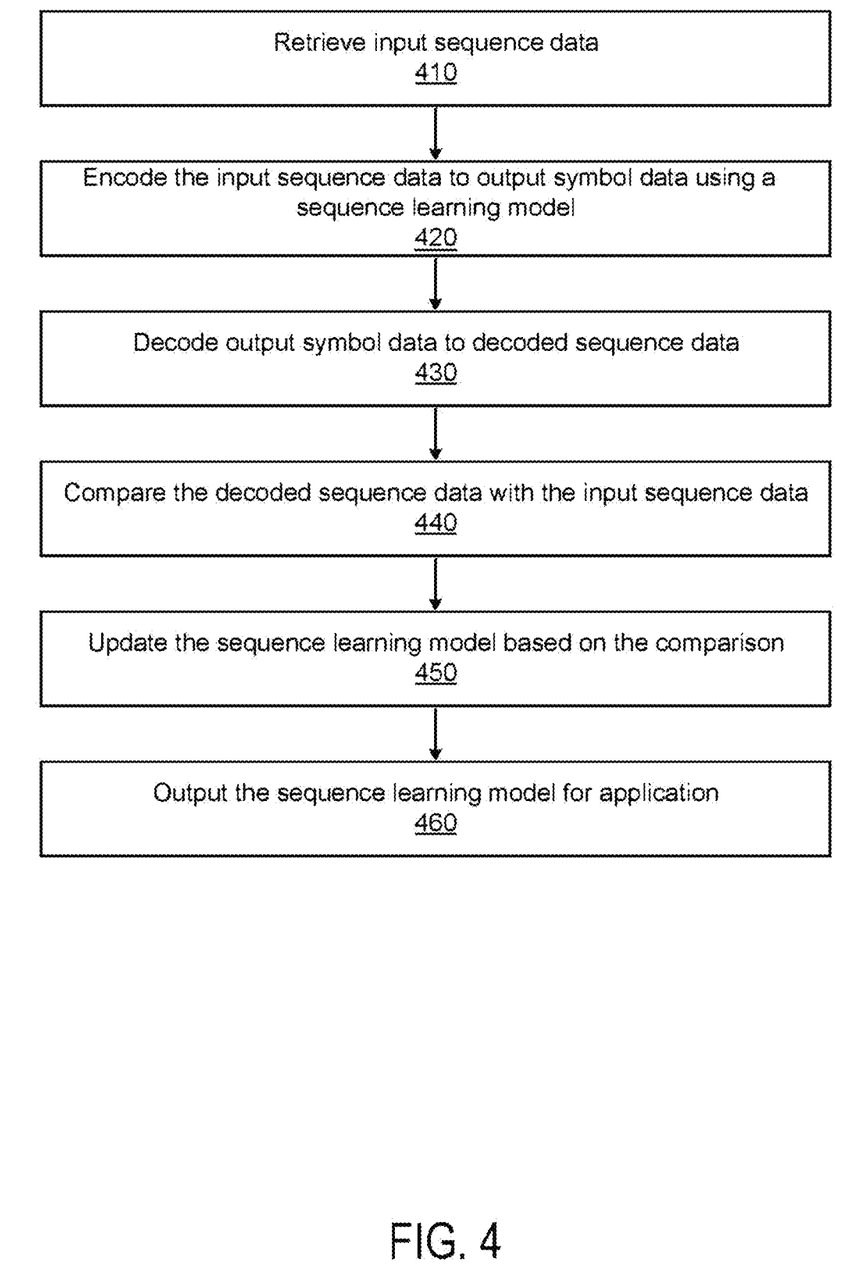
FIG. 4 is a flow diagram illustrating an example process of training a sequence learning model.

To further illustrate the training of a sequence learning model by the modeling module 106, FIG. 4 is a flow diagram illustrating an example process of training a sequence learning model. FIG. 4 attributes the steps of the process to the modeling module 106. However, some or all of the steps may be performed by other entities. In addition, some embodiments may perform the steps in parallel, perform the steps in different orders, or perform different steps.

Initially, the modeling module 106 retrieves 410 input sequence data. For example, the input sequence data can include time sequences of financial data, temperature recordings, sound waves, pen trajectories in handwritten notes, or videos of human actions. The modeling module 106 encodes 420 the input sequence data to output symbol data based on a sequence learning model. For example, the modeling module 106 may choose an output symbol from a pre-determined symbol set based on a policy. In particular, the modeling module 106 may map a character to an input sequence of sound wave.

The modeling module 106 decodes 430 output symbol data to decoded sequence data. For example, the modeling module 106 may map the encoded symbol to a time sequence (such as a sound wave). The decoded sequence is to match or reconstruct the input sequence as closely as possible, but they may be substantially different, especially at the early stage of training. The modeling module 106 compares 440 the decoded sequence data with the input sequence data. For example, the modeling module 106 computes the difference (such as a distance) between the decoded sequence and the input sequence.

The modeling module 106 updates 450 the sequence learning model based on the comparison. For example, the modeling module 106 estimates the expected end reward based on the comparison (such as using the distance computed in the previous step) and updates the sequence learning model to maximize the expected end reward. In one embodiment, the modeling module 106 runs the steps 410-450 recursively. In one embodiment, after updating the sequence learning model, the process returns to step 410 and the modeling module 106 retrieves next input sequence data and trains the sequence learning model by following the steps 420-450 all over again. In one embodiment, the modeling module 106 trains the sequence learning model recursively until the expected end reward converges, e.g., until when in each loop the expected end reward is approximately the same value, or within a small range of value. Alternatively, the modeling module 106 implements the steps 420-450 recursively until a loss function based on the difference of the input sequence and the output symbols converges to a small value (such as zero).

The modeling module 106 outputs 460 the sequence learning model for application. For example, the modeling module 106 sends the sequence learning model to the application module 108 for application. In another example, the modeling module 106 stores the sequence learning model in the database 190 and other entities can retrieve the sequence learning model for application.

Figure 5:
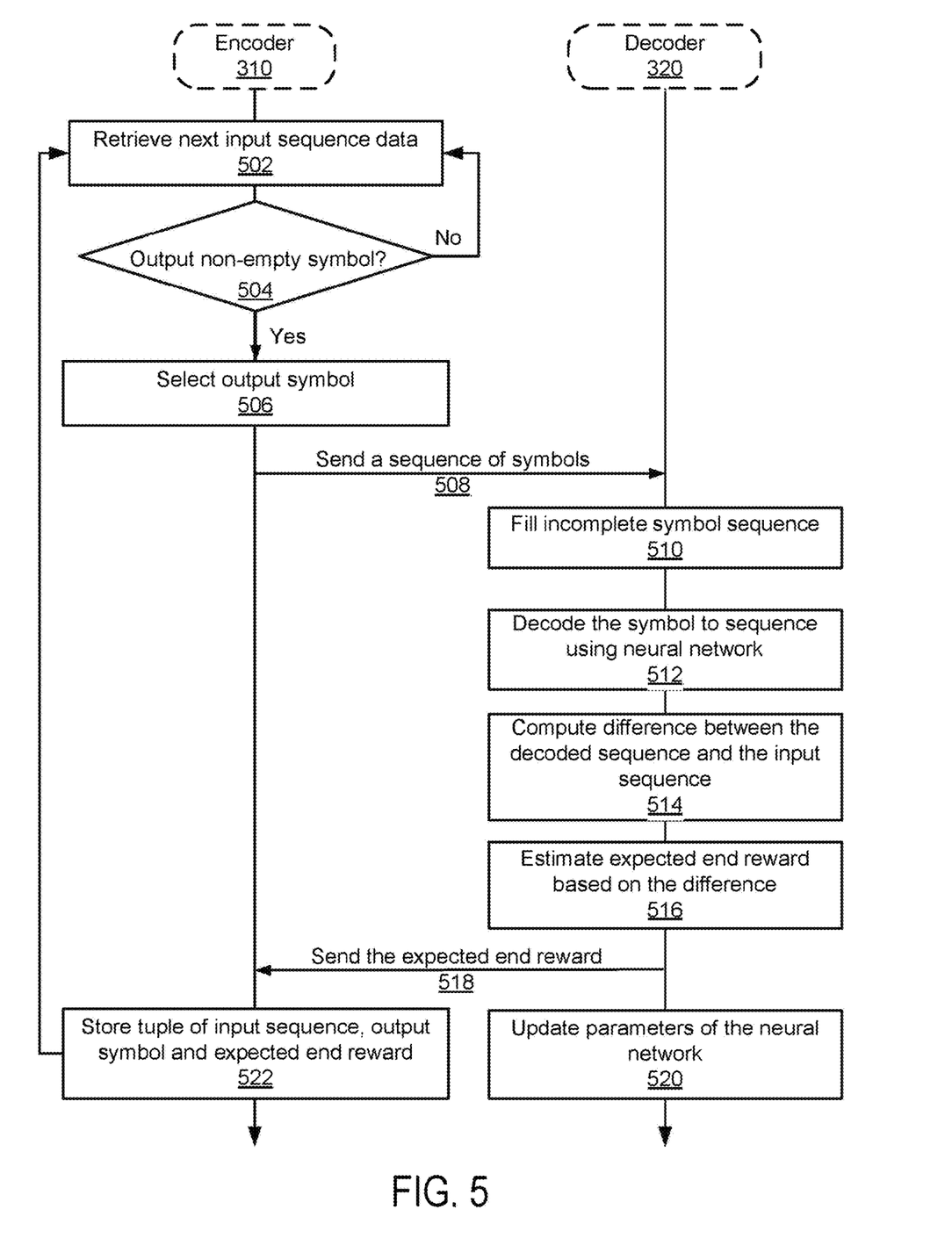
FIG. 5 is a flow diagram of interactions between an encoder and a decoder of the modeling module illustrated in FIG. 3.

FIG. 5 is a flow diagram of interactions between the encoder 310 and the decoder 320 of the modeling module 100 illustrated in FIG. 3. In the example illustrated in FIG. 5, the encoder 310 retrieves 502 next input sequence data. For example, the input sequence data can include time sequences of financial data, temperature recordings, sound waves, pen trajectories in handwritten notes, or videos of human actions. The encoder 310 determines 504 whether to output a non-empty symbol. For example, the encoder 310 determines whether to emit an output symbol that is not an empty symbol corresponding to the input sequence data or purposely to omit the emission of a non-empty symbol (e.g., emit an empty symbol c). In one embodiment, the encoder 310 determines whether to output a specific symbol based on the model.

If the encoder 310 determines not to output a non-empty symbol (e.g., determines to output an empty symbol E), the process returns to the step 502 and the encoder 310 retrieves the next input sequence. If the encoder 310 determines to output a non-empty symbol, the encoder 310 selects 506 output symbol. For example, the encoder 310 selects a symbol from an output symbol set. An output symbol set can be a set of fixed number of characters (such as English letters). The encoder 310 sends 508 a sequence of symbols to the decoder 320. For example, the encoder 310 determines a symbol for each element in the input sequence and encodes a whole input sequence into a sequence of symbols. The element of input sequence can be a segment of the input sequence. The sequence of symbols can include non-empty symbols and empty symbols.

The decoder 320 fills 510 incomplete symbol sequence. For example, the decoder 320 fills up the incomplete symbol sequence with randomly selected symbols. For example, the randomly selected symbols can be randomly selected from the output symbol set. The decoder 320 decodes 512 the symbols to sequence using neural network. For example, the decoder 320 maps the symbols to the decoded sequence based on the pairs of symbols and sequences generated and stored during a previous training session or loop. The decoded sequence is to match or resemble the input sequence as closely as possible.

The decoder 320 computes 514 difference between the decoded sequence and the input sequence. For example, the decoder 320 calculates a distance between the decoded sequence and the input sequence. The decoder 320 estimates 516 expected end reward based on the difference. For example, the decoder 320 uses the distance to estimate the expected end reward. The decoder 320 sends 518 the expected end reward to the encoder 310. The decoder 320 updates 520 parameters of the neural network. For example, the decoder 320 updates the parameters based on the mapping between the elements of the pairs.

The encoder 310 stores 522 tuple of input sequence, output symbols, and the expected end reward. For example, upon receiving the expected end reward, the encoder 310 stores the tuple of the input sequence, output symbols, and the expected end reward in the database 190. In this way, the encoder 310 and the decoder 320 cooperate to build up a sequence learning model that indicates the mapping between an input sequence and a series of output symbols. The expected end reward can be a measure evaluating how well the mapping between the input sequence and the output symbols functions.

After the step 522, the process returns to the beginning and starts from the step 502 again. The encoder 310 and decoder 320 cooperates and implements the steps 502-518 recursively until the tuple of the input sequence, output symbols, and the expected end reward reaches a stable status. For example, the expected end reward associated to each pair of input sequence and output symbols approaches approximately the same value, or within a small range of values, for each loop of the implementation. Alternatively, the encoder 310 and decoder 320 implements the steps 502-518 recursively until a loss function based on the difference of the input sequence and the output symbols converges to a small value (such as zero).

Figure 6:
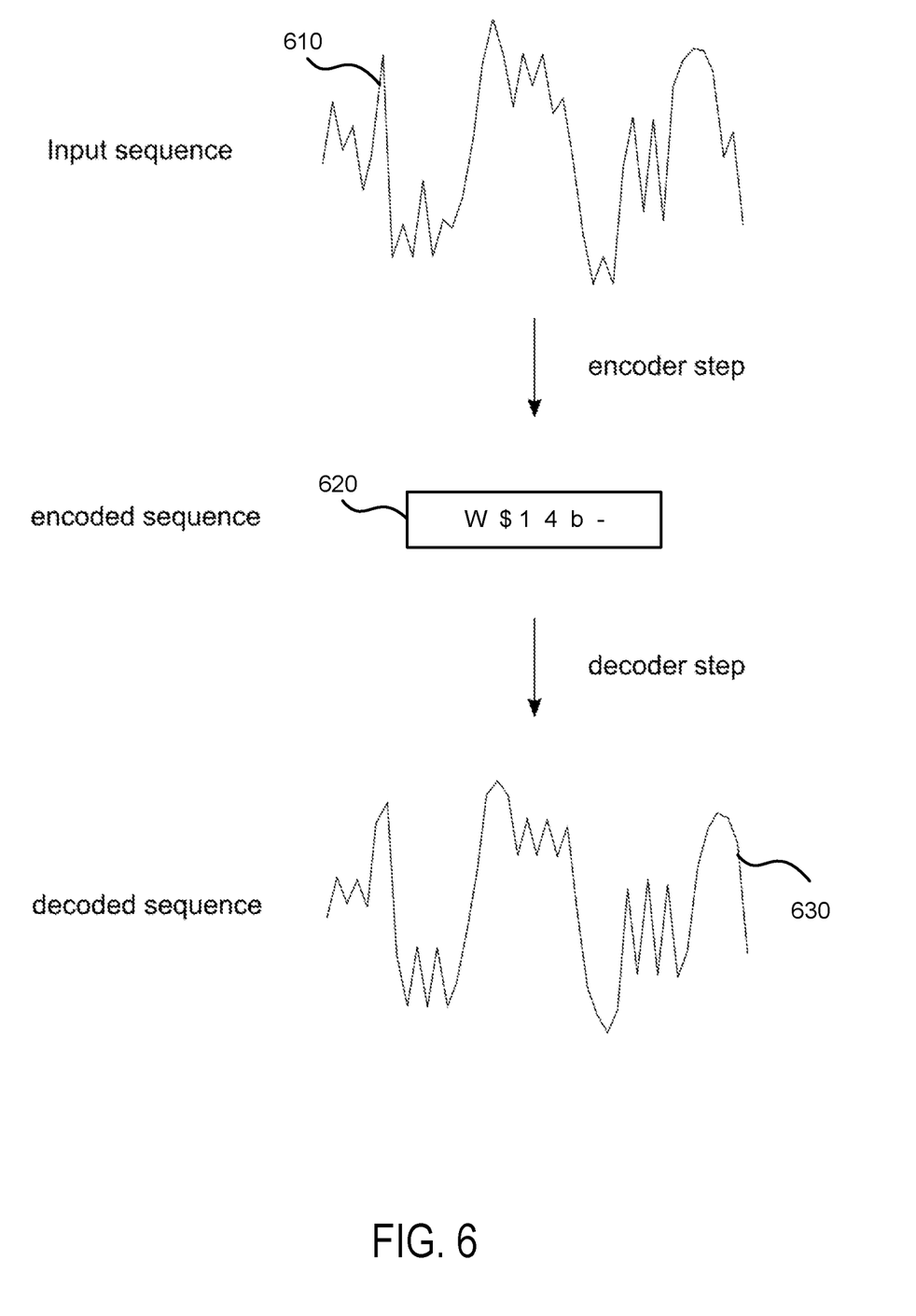
FIG. 6 is a diagram illustrating the encoding of an input sequence into an encoded sequence and the decoding of the encoded sequence into a decoded sequence.

FIG. 6 is a diagram illustrating the encoding of an input sequence into an encoded sequence and the decoding of the encoded sequence into a decoded sequence. In the illustrated embodiment of FIG. 6, representation 610 is an input sequence. For example, the input sequence 610 may be a time sequence of sound waves. In another example, the input sequence 610 may be a time series of financial data or temperature recordings. Through encoding, the input sequence 610 is mapped to an encoded symbol sequence represented by a sequence of distinct characters 620. For example, each character in the encoded sequence 620 is mapped to a segment of the input sequence, e.g., sound wave within a certain time period (such as 0.5 second, one second, two seconds, etc.). In one embodiment, the sequence learning system 100 is to train the sequence learning model to obtain the encoded sequence of symbols as short as possible.

After decoding, the encoded sequence of characters 620 is transformed to a decoded sequence 630. The decoded sequence 630 is to resemble or match the input sequence 610 as closely as possible. For example, the decoded sequence 630 may be a time sequence of sound waves of the same or different length in time as the input sequence 610, and have similar latent frequency or similar shape to that of the input sequence 610. The sequence learning system 100 is to train the sequence learning model to obtain the decoded sequence as close to the input sequence as possible.

Figure 7:
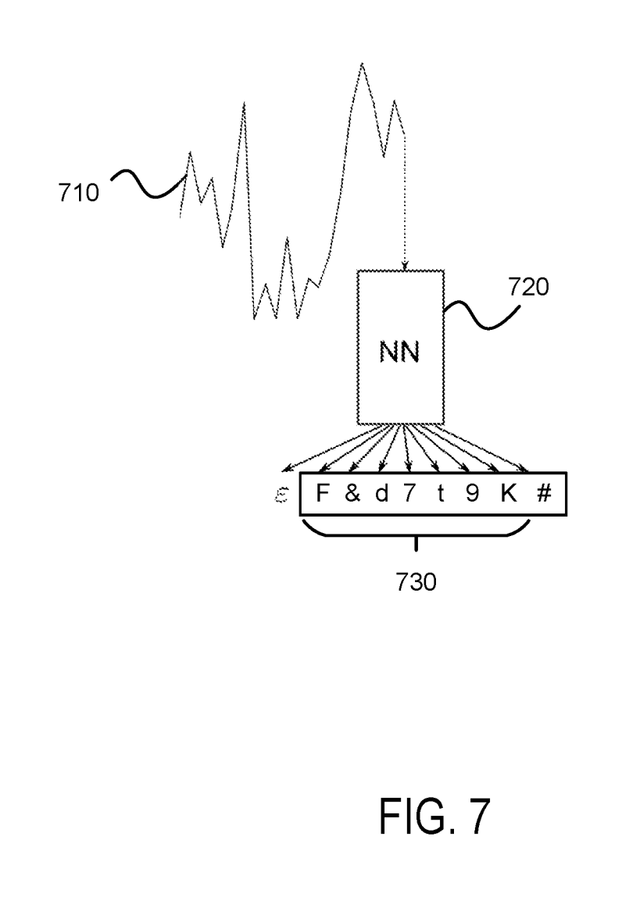
FIG. 7 is a diagram illustrating an encoder as a neural network that receives a sequence and outputs symbols.

FIG. 7 is a diagram illustrating the encoder 310 as a neural network that receives a sequence and outputs symbols. In the illustrated embodiment of FIG. 7, representation 710 is an input sequence. For example, the input sequence 710 may be a time sequence of sound waves. In another example, the input sequence 710 may be a time series of financial data or temperature recordings. The component 720 represents the encoder 310 configured as a neural network. A sequence of symbols 730 represents the output symbolic representations for the encoder 310. For example, the sequence of symbols 730 is mapped to the input sequence 710. In one embodiment, the output symbolic representations 730 may be a sequence of letters.

Figure 8:
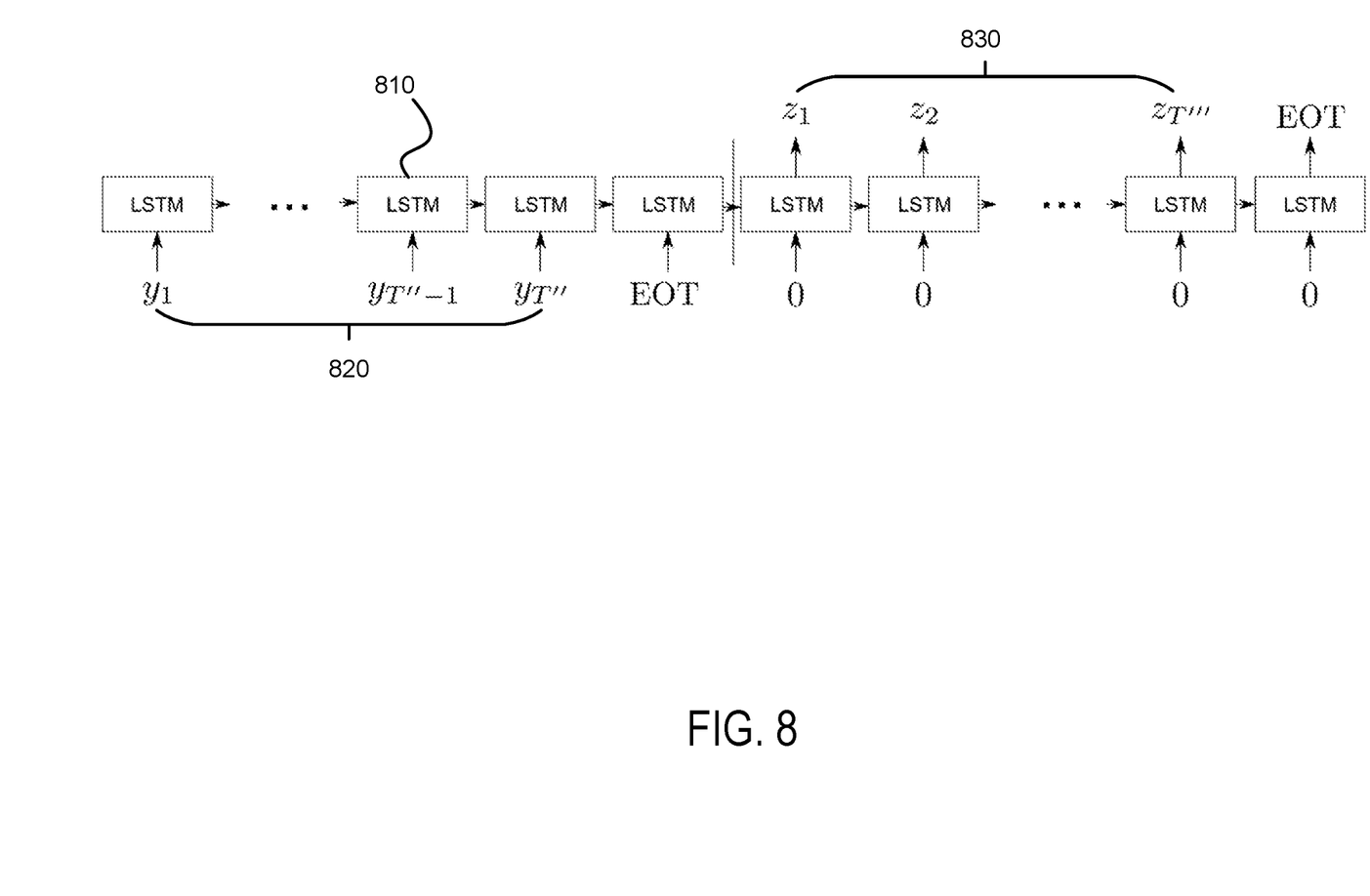
FIG. 8 is a diagram illustrating a decoder as a Long Short Term Memory (LSTM) recurrent neural network.

FIG. 8 is a diagram illustrating the decoder 320 as a Long Short Term Memory (LSTM) recurrent neural network. As illustrated embodiment of FIG. 8, box 810 represents the LSTM recurrent neural network. For example, the decoder 320 may be configured as the LSTM recurrent neural network. The variables yi, i=1 . . . T" 820, followed by an end-of-transmission (EOT) symbol, represent the input symbolic representations to the decoder 320. For example, the input to the decoder 320 may be the encoded symbols generated by the encoder 310. The input symbols 820 are followed by the EOT symbol. The variables zi, i=1 . . . 1'" 830 represent the output of the decoder 320. For example, the output 830 of the decoder 320 may be a decoded sequence that is to match the input sequence of the encoder 310 as closely as possible.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention. For example, the operation of the preferred embodiments illustrated above can be applied to other media types, such as audio, text and images.

The invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the invention include process steps and instructions described herein in the form of an algorithm. It should be noted that the process steps and instructions of the invention could be embodied in software, firmware or hardware, and when embodied in software, could be downloaded to reside on and be operated from different platforms used by real time network operating systems.

The invention also relates to an apparatus for performing the operations herein. This apparatus may be specially constructed for the required purposes, or it may comprise a general-purpose computer selectively activated or reconfigured by a computer program stored on a computer readable storage medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will be apparent to those of skill in the art, along with equivalent variations. In addition, the invention is not described with primary to any particular programming language. It is appreciated that a variety of programming languages may be used to implement the teachings of the invention as described herein, and any reference to specific languages are provided for disclosure of enablement and best mode of the invention.

The invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter.

Accordingly, the disclosure of the invention is intended to be illustrative, but not limiting, of the scope of the invention, which is set forth in the following claims.

---

Algorithm 1: The Training Process

---

Output Optimized parameters θ of the encoder network and θ' of the decoder network, randomly initialized.
Input Set of sequences X and set of symbols Y, trade-off factor α, and learning rates η and η' for the encoder and decoder respectively.
while training error too high do
    while encoder training steps do
        Estimate $\nabla_\theta J^{enc}(\theta)$ as $$\nabla_\theta J^{enc}(\theta) \approx \frac{1}{T} \sum_{t=1}^{T} \sum_{y_t \in Y \cup \{\epsilon\}} \nabla_\theta H\pi(y_t \mid Y_{1:t-1}, \pi) \cdot q_{enc}^{dec}(Y_{1:t-1}, y_t, \pi) \quad (5)$$

Update θ to maximize
            $\theta \leftarrow \theta + \eta \nabla_\theta J^{enc}(\theta)$
        Save input and generated pair in training set for decoder
            $T^{dec} \leftarrow T^{dec} \cup (X, Y)$
    end
    while decoder training steps do
        Pick sample from $T^{dec}$
        Compute Z = Dec(Y), and compute loss function $J^{dec}$ (Z, X)
            $\theta^{RNN} \leftarrow RNN - \eta' \nabla_\theta J^{dec}$
        Update parameters of RNN
    end
end

---

What is claimed is:

1. A computer method for training a sequence learning model based on reinforcement learning and neural networks, the method comprising:
retrieving input sequence data, the input sequence data including one or more input time sequences;
encoding the input sequence data into an output symbol sequence containing output symbol data using a first neural network trained to implement a sequence learning model, the output symbol data including one or more symbolic representations;
decoding, using a second neural network, the output symbol data to decoded sequence data, the decoded sequence data including one or more decoded time sequences that are to match the one or more input time sequences in the input sequence data;
comparing the decoded sequence data with the input sequence data,
wherein comparing the decoded sequence data with the input sequence data comprises computing a distance between one of the decoded time sequences and the one of the input time sequences that the one decoded time sequence is to match; and
training the first neural network to update the sequence learning model based on the comparison, wherein training further comprises:
determining a length of the output symbol data;
estimating an expected end reward, wherein the expected end reward is based on:
a distance between the decoded time sequence and the input time sequence; and
an additive inverse of a length of the output symbol sequence; and
estimating the expected end reward further comprises:
computing a first term by multiplying the additive inverse of the length by a coefficient;
computing a second term by multiplying the distance by one minus the coefficient; and
adding the first term to the second term; and
adjusting one or more parameters of the sequence learning model to maximize the expected end reward.

2. The method of claim 1, wherein the input time sequence includes financial data, a temperature recording, a sound wave, a handwritten note of pen trajectories, or a video of human actions.

3. The method of claim 1 further comprising:
determining whether to encode the input sequence data into a symbolic representation or into an empty representation.

4. The method of claim 1 further comprising:
storing a tuple of the input sequence data, the output symbol data and the expected end reward.

5. The method of claim 4, wherein the steps are implemented recursively until the tuple converges below a threshold.

6. A non-transitory computer-readable storage medium storing executable computer program instructions for training a sequence learning model based on reinforcement learning and neural networks, the computer program instructions comprising instructions for:
retrieving input sequence data, the input sequence data including one or more input time sequences;
encoding the input sequence data into an output symbol sequence containing output symbol data using a first neural network trained to implement a sequence learning model, the output symbol data including one or more symbolic representations;
decoding, using a second neural network, the output symbol data to decoded sequence data, the decoded sequence data including one or more decoded time sequences that are to match the one or more input time sequences in the input sequence data;
comparing the decoded sequence data with the input sequence data,
wherein comparing the decoded sequence data with the input sequence data comprises computing a distance between one of the decoded time sequences and the one of the input time sequences that the one decoded time sequence is to match; and
training the first neural network to update the sequence learning model based on the comparison, wherein training further comprises:
determining a length of the output symbol data;
estimating an expected end reward, wherein the expected end reward is based on:
a distance between the decoded time sequence and the input time sequence; and
an additive inverse of a length of the output symbol sequence; and
estimating the expected end reward further comprises:
computing a first term by multiplying the additive inverse of the length by a coefficient;
computing a second term by multiplying the distance by one minus the coefficient; and
adding the first term to the second term; and
adjusting one or more parameters of the sequence learning model to maximize the expected end reward.

7. The computer-readable storage medium of claim 6, wherein the input time sequence includes financial data, a temperature recording, a sound wave, a handwritten note of pen trajectories, or a video of human actions.

8. The computer-readable storage medium of claim 6, wherein the computer program instructions further comprise instructions for:
   determining whether to encode the input sequence data into a symbolic representation or into an empty representation.

9. The computer-readable storage medium of claim 6, wherein the computer program instructions further comprise instructions for:
   storing a tuple of the input sequence data, the output symbol data and the expected end reward.

10. The computer-readable storage medium of claim 9, wherein computer instructions executed sequentially from claim 9 are implemented recursively until the tuple converges below a threshold.

11. A computer system for training a sequence learning model based on reinforcement learning and neural networks, the system comprising:
   a processor; and
   memory storing an encoder for:
      retrieving input sequence data, the input sequence data including one or more input time sequences; and
      encoding the input sequence data into an output symbol sequence containing output symbol data using a first neural network trained to implement a sequence learning model, the output symbol data including one or more symbolic representations;
   a decoder for:
      decoding, using a second neural network, the output symbol data to decoded sequence data, the decoded sequence data including one or more decoded time sequences that are to match the one or more input time sequences in the input sequence data; and
   comparing the decoded sequence data with the input sequence data,
      wherein comparing the decoded sequence data with the input sequence data comprises computing a distance between one of the decoded time sequences and the one of the input time sequences that the one decoded time sequence is to match; and
   the encoder is also for:
   training the first neural network to update the sequence learning model based on the comparison, wherein training further comprises:
      determining a length of the output symbol data;
      estimating an expected end reward, wherein the expected end reward is based on:
         a distance between the decoded time sequence and the input time sequence; and
         an additive inverse of a length of the output symbol sequence; and
      estimating the expected end reward further comprises:
         computing a first term by multiplying the additive inverse of the length by a coefficient;
         computing a second term by multiplying the distance by one minus the coefficient; and
         adding the first term to the second term; and
      adjusting one or more parameters of the sequence learning model to maximize the expected end reward.

12. The system of claim 11, wherein the input time sequence includes financial data, a temperature recording, a sound wave, a handwritten note of pen trajectories, or a video of human actions.

13. The system of claim 11, wherein the encoder is further for:
   determining whether to encode the input sequence data into a symbolic representation or into an empty representation.

14. The system of claim 11, wherein the encoder is further for:
   storing a tuple of the input sequence data, the output symbol data and the expected end reward.

* * * * *